United States Patent [19]
Kojima

[11] Patent Number: 5,383,029
[45] Date of Patent: Jan. 17, 1995

[54] INFORMATION RETRIEVAL SYSTEM

[75] Inventor: Kiyonobu Kojima, Kanagawa, Japan

[73] Assignee: Sony Corporation, Japan

[21] Appl. No.: 875,264

[22] Filed: Apr. 28, 1992

[30] Foreign Application Priority Data

May 14, 1991 [JP] Japan .................. 3-138185

[51] Int. Cl.6 .............. H04N 1/00; G06K 9/80; G06F 15/64
[52] U.S. Cl. .................. 358/403; 358/451; 382/47
[58] Field of Search .............. 358/403, 448, 451; 340/706; 395/145; 355/40, 53; 353/25, 26 R, 26 A, 27 R, 27 A; 382/41, 44, 47

[56] References Cited
U.S. PATENT DOCUMENTS

| | | |
|---|---|---|
| 3,689,894 | 9/1972 | Laura et al. . |
| 3,759,611 | 9/1973 | O'Connell et al. . |
| 4,273,440 | 6/1981 | Froessl .................. 358/280 X |
| 4,553,261 | 11/1985 | Froessl .................. 382/57 |
| 4,893,333 | 1/1990 | Baran et al. .................. 358/468 |
| 4,992,887 | 2/1991 | Aragaki . |
| 5,083,214 | 1/1992 | Knowles . |
| 5,109,439 | 4/1992 | Froessl .................. 382/61 |
| 5,133,024 | 7/1992 | Froessl . |
| 5,170,466 | 12/1992 | Rogan et al. .................. 395/145 |
| 5,222,033 | 6/1993 | Ono . |

Primary Examiner—Bentsu Ro
Attorney, Agent, or Firm—Ronald P. Kananen

[57] ABSTRACT

An information retrieval system in which image information inputted by an image inputting device 11, such as an image scanner, is reduced in size by an image-reducing unit 16. An identification code for retrieval is assigned to the reduced image before being printed by a printer 18. In this manner, a plurality of reduced images 31 and identification codes 32 associated with the reduced images 31 are printed on a paper sheet 30. The identification codes 32 on the paper sheet 30 are read by a code reader 21 so that a CPU 13 may extract the corresponding image information from a disc device 15 for display on a display device 24. By binding the printed paper sheets 30 into a file, the storage space size is diminished, while the operation of turning over leaves of the file for retrieval is expedited. The image information is also retrieved easily with the aid of the identification codes 32.

13 Claims, 2 Drawing Sheets

INFORMATION RETRIEVAL SYSTEM

BACKGROUND OF THE INVENTION

1. Field of the Invention

This invention relates to an information retrieval system and, more particularly, to a system for retrieving a large quantity of image information.

2. Description of the Prior Art

As a method for filing the image information by storing the image information, such as document or photographs, and calling out desired image information when it is needed, it is known to file the paper carrying the image information or the copy sheet of the original image in a binder or the like for storage on a shelf. This is extensively utilized filing method basically does not need mechanical or electronic devices as the information may be searched by direct visual inspection. The operation of turning over leaves may be performed speedily and intuitively. To find a particular page in a volume of a file, pages are turned rapidly when to search for a candidate page similar to the particular page based on rough visual impressions received from the pages as they are turned over one after another. During or after the operation of turning over the pages of the file, the contents of the particular candidate page are read roughly for ascertaining whether the candidate page is the desired particular page. This searching method is effective even when the title or the keyword of the particular page is unclear or when the table of contents or the index is incomplete. There are many instances wherein one has to resort to this cumbersome retrieval method of turning over pages of the file one after another.

Directly filed paper sheets also take up much space while being heavy and difficult to handle. Alternative filing systems photograph the documents and store the image information such as on a microfilm or optically reading the documents and recording the image information on a recording medium such as a magneto-optical disc in a digital form have been developed and used extensively. These filing systems are more convenient and compact than the system of directly binding paper sheets because the space needed for storing the same amount of the information is significantly diminished.

However, in a filing system employing the above-mentioned microfilm, the contents of the stored information cannot be checked without using a film viewer or like similar device. Although page turning may be performed speedily with the use of a film viewer, it is not possible to record many pages on one film; thus, the retrieval speed on the whole is lowered because of the time-consuming operation is required for film re-loading. In addition, since the pages are sequentially arranged on each film, film feed time is increased if it is desired to check the last page on the film starting from the leading end of the film by a viewer.

On the other hand, while it is possible with the electronic image filing to store a large quantity of the image information, the stored information cannot be grasped intuitively unless a disc reproducing apparatus or a CRT display is used for checking the contents of the information, preventing a speedy turning over of the leaves.

OBJECT AND SUMMARY OF THE INVENTION

In view of the above depicted state of the art, it is an object of the present invention to provide an information retrieval system whereby the space for storing the files may be diminished and the operation of turning over pages may be effected speedily while the contents of the stored information may be read easily.

The present invention provides an information retrieval system comprising: image inputting means for inputting the image information, storage means for storage of the image information inputted by said image inputting means, and identification codes for retrieving said image. The codes are associated with the image information in a one-to-one relation. A printer prints said input image information after an image-reducing operation along with said identification codes. A code reader is provided for reading said identification codes, and retrieval means for retrieving the image information associated with the identification code in corresponding to the identification code read out by the code reader.

According to a further aspect of the invention, the functions of allocating the identification codes to the image information, reducing the input image information and retrieving the corresponding image information in conformity to the read-out identification codes may be implemented, for example, by a software program driving a CPU system.

The information retrieval system according to the present invention, achieves the above-mentioned objects since the image information inputted by the image inputting means may be stored in memory means in association with identification codes used for retrieval of the image information, and the input image information is reduced in size for printing with the identification code, thereby, reducing the storage space for the printing and expediting the operation of turning over pages. Since the identification codes of the printed reduced images are read for retrieving the associated image information from memory means, the details of the image information may be confirmed easily by using the identification codes.

DESCRIPTION OF THE PREFERRED EMBODIMENT

Figure 1:
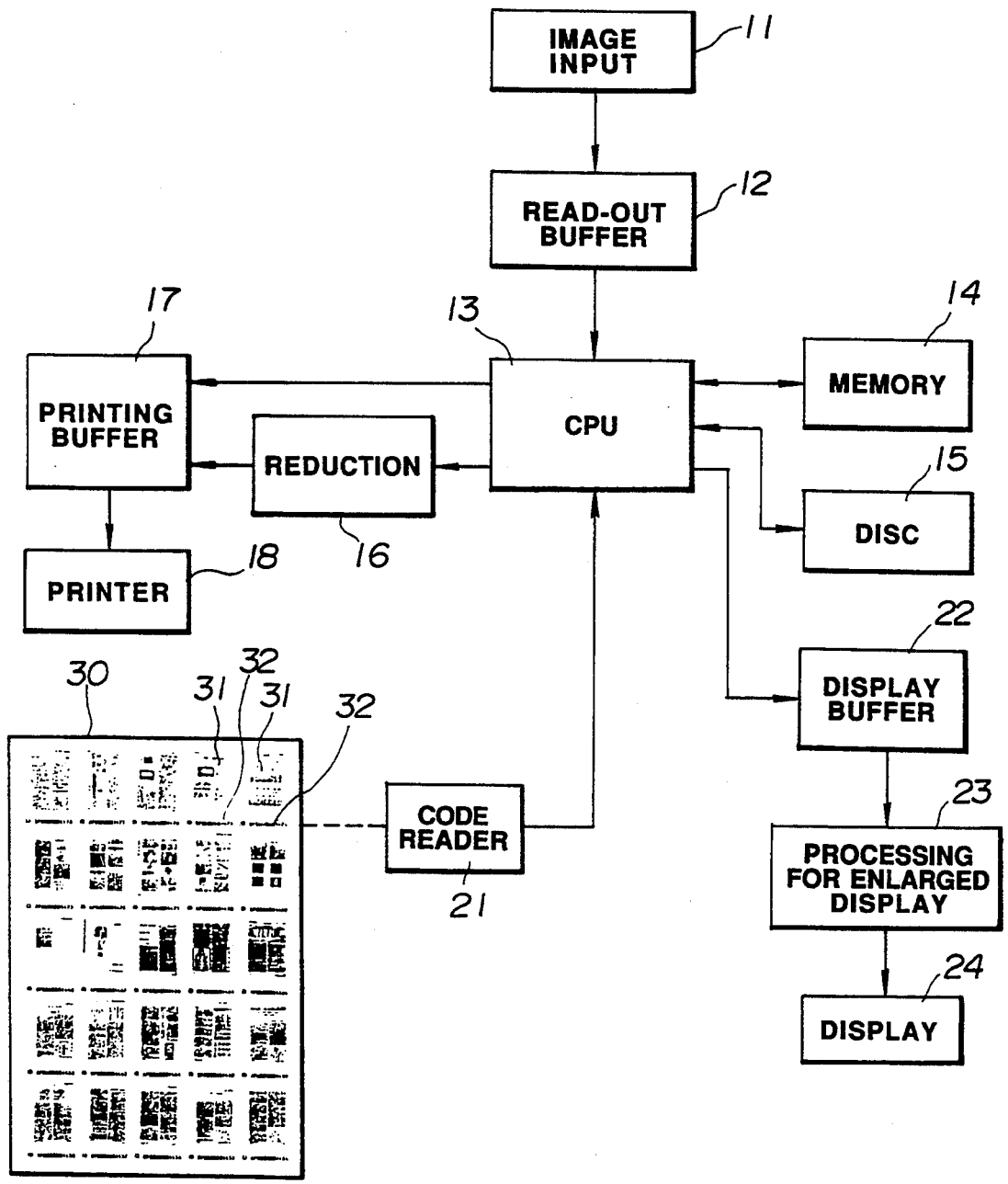
FIG. 1 is a block circuit diagram showing a schematic arrangement of an information retrieval system embodying the present invention.

FIG. 1 is a block diagram showing a schematic arrangement of an information retrieval system embodying the present invention.

In this figure, an image input section 11, such as an image reader or an image scanner, reads out image-carrying sheets, such as documents, photographs or pictures, and converts them into electrical image signals and then into digital image information which is sent to a read-out buffer memory 12 for transient storage. The image information thus transiently stored in the read-out buffer 12 is read out by a central processing unit (CPU) 13. The CPU 13 effectuates image processing, while transmitting or receiving the image information to or from a memory 14. The image information thus processed by the CPU is transmitted to a disc device 15 for recording the image information on a disc, for example, a magneto-optical disc.

Specifically, the image input section 11 reads out the image original in the form of binary values of white and black with a high resolution of the order of 12 to 16 lines/mm and stores the binary image data directly in a read-out buffer 12. Although the scored data may be directly recorded on a recording medium, such as the above-mentioned magneto-optical disc, the data is preferably recorded after data compression. For such data compression, perfect compression codes are used, such as those used in facsimile devices. In particular, the data compression code may be either the modified Hamming (MH) code, modified READ (MR) code or modified MR (MMR) code, which revert all the compressed data completely back to original data during decoding. This data compression is executed as the CPU 13 effects data reading and writing on or from the memory 14. An identification code, composed e.g. of a series of numerals, is assigned to the information of each input image, and the compressed image information is recorded, along with the identification code, on the recording medium, such as a disc.

The CPU 13 then reduces the size of the input image information or the image information read out from the disc device 15 with a reducing functional unit 16. The contracted image information is then written into a printing buffer memory 17. At this time, the identification code associated in a one-to-one relation with the image information is transmitted from CPU 13 to the printing buffer memory 17 and written therein so as to be printed in the vicinity of the reduced image. This identification code may be serial numbers automatically generated by the CPU 13 or manually entered by an inputting means, such as a keyboard. The patterns of the identification codes may be read-out fonts capable of being read by an optical character readout (OCR) device, as prescribed in JIS 6250, or bar codes. When the writing of these identification codes and associated reduced image information in the printing buffer 17 has been repeated a predetermined number of times, corresponding for instance to 25 image pages, the stored contents of the printing buffer 17 are forwarded to a printer 18 for printing. In this manner, a plurality of pages of the reduced images 31 as well as the associated identification codes 32 are printed on one sheet of paper 30, as shown in FIG. 2.

Figure 2:
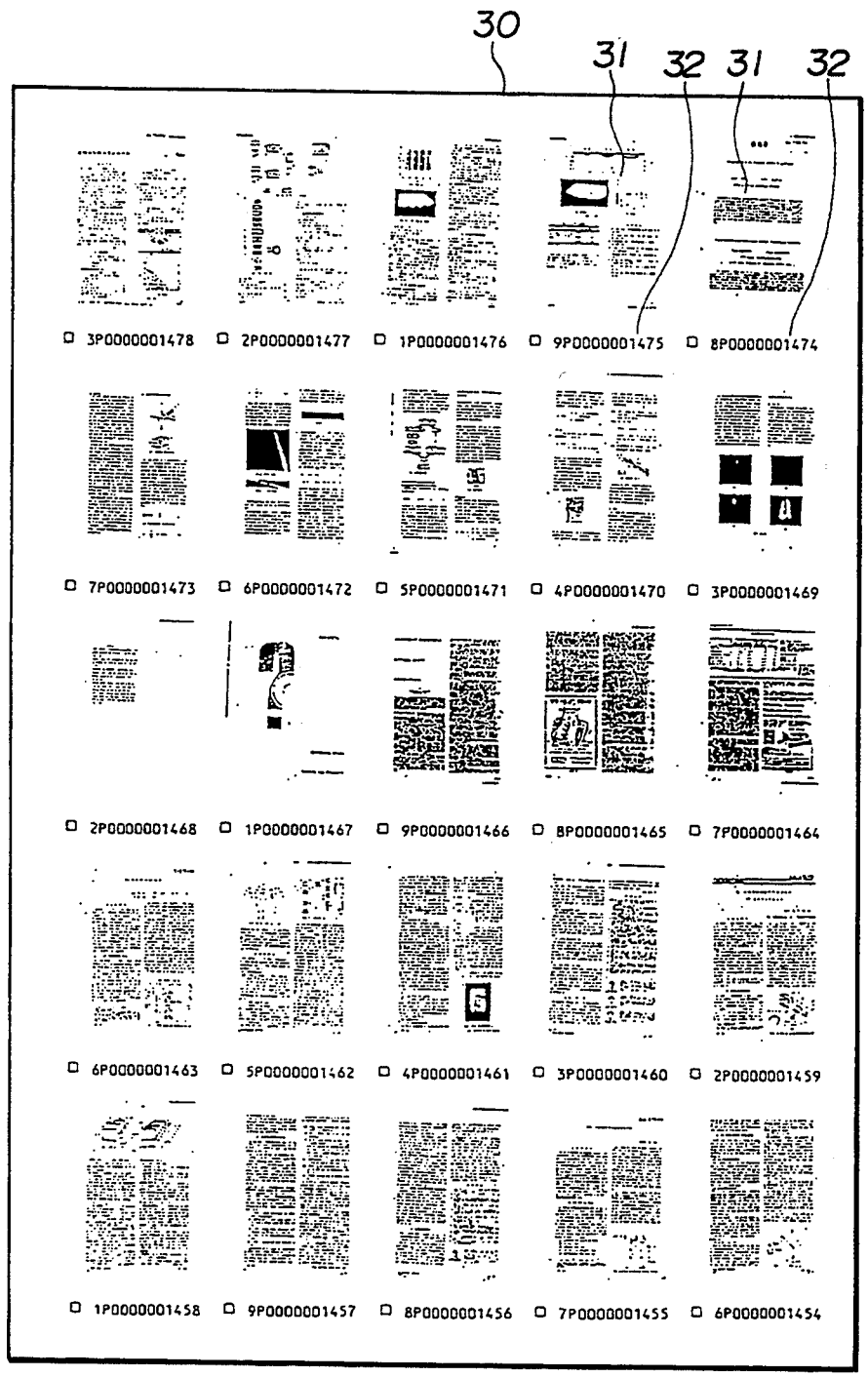
FIG. 2 is a plan view showing several examples of paper sheets and identification codes printed in accordance with the embodiment shown in FIG. 1.

The identification codes 32 printed on the paper sheet 30 as shown in FIG. 2 are read out by means of a code reader 21 or an OCR scanner for retrieving and reading the associated image information from a disc of the disc device 15. The read-out image information is transmitted to a display buffer memory 22 and processed with a display enlarging technique by an enlarging processing functional device 23, as the occasion may demand, before the corresponding image is displayed by a display device 24, such as a CRT display. The detailed contents of the image 31 associated with the identification code 32 shown in FIG. 2 may be read from the displayed image. The retrieved image information may also be transmitted directly, that is without image size reduction, to the printing buffer 17 for printing on the overall sheet surface by means of the printer 18. Meanwhile, the operation of retrieving the image information on the basis of the read-out identification codes is executed by CPU 13. The identification codes to be retrieved may naturally be entered manually using numeral keys of a keyboard inputting device, not shown, instead of reading the identification codes 32 printed on the paper sheet 30 with the code reader 21.

It is noted that the above-mentioned image-reducing unit 16 or the image-enlarging unit 23 may be implemented by CPU 13 through software techniques, A typical image-reducing operation performed in the image-reducing unit 16 is the operation of reducing the size of the image along its length and width to one-fifth of the original image length and width, thereby, reducing the image area to 1/25 of the original image area. The information of the image reduced in area to 1/25 is transmitted to the printing buffer 17 so as to be sequentially written or pasted within a subarea of the total memory area of the printing buffer 17. For instance, the total memory area of the printing buffer may be divided into 5 rows and 5 columns forming 25 subareas. The printing patterns for the identification codes associated with the reduced images are written at predetermined locations, such as at the lower extreme ends, of the subareas, The 25 reduced images, or 25 pages, thus stored in the printing buffer memory 17, are transmitted to the printer 18 for print-out to produce a printing having a printed side 30 as shown in FIG. 2. It is not required of the reduced images 31 of the printing to be of such high resolution as to permit the contents to be read precisely. A resolution which permits a gross visual impression to be grasped to the same extent as the impression obtained when turning over the leaves of a file is sufficient. If the reduced image is difficult to view unaided, it may be seen instead through a magnifying lens. To read out details of the image contents, the associated identification code may be read by the code reader 21 and the disc searched on the basis of the identification code so that the associated image is displayed or printed by the printer substantially at its original size.

When a plurality of sets of the reduced images and identification codes are printed in this manner on each paper sheet 30, and a plurality of the printed paper sheets 30 are bound in a file, storage space is reduced for instance, herein the space required is about 1/25 of the space required for conventional paper sheet filing. Besides, the stored information may be controlled in the same manner as in the case of the conventional paper sheet filing. The operation of turning over pages of the file may be expedited because the image information corresponding to a number of pages, i.e. 25 pages may be viewed at one time. The search operation may be further expedited and facilitated because searchers repeating the searching operation by turning over pages of the file a number of times may learn in which location of which page a certain information is contained. The searchers may then operate the device when it is desired to know the details of the image information. Besides, the device may be used by multiple searchers because the searching operation may be mainly performed with the paper file. When circulating documents in an office, for instance, it is sufficient to circulate only a summary of the reduced images, so that the number of circulations may be diminished. Since only those in need of the details of the image information may utilize the identification codes to take out the image information, there is no necessity to store manuscripts for duplication.

It is noted that printing of the reduced images and associated identification codes may be made not only on ordinary paper sheets but also on labels or adhesive sheets so that the printed labels or adhesive sheets may be affixed to necessary places convenient for later references, For example, reduced images of a notice concerning the date and place of conference or a map attached to a letter of invitation may be affixed to the column of the date of a schedule table. A list of addresses of the New Year's Greetings may be affixed to the last page of a diary corresponding to the end of the year, to dispense with the labor of noting down the information in detail in the diary. As for the detailed contents, identification codes may be read out by the code reader 21 for promptly searching the associated image information from a disc or the like, so that the image information may be readily printed out by the printer 18 or displayed on the display device 24. In connection with the above-described method of utilization of the information retrieval system, the identification codes only may be printed on the labels which may be affixed to places under suitable headings which will enable their meaning to be understood by the searchers. In this case, any searcher in need of the information may cause the identification codes to be read to search the corresponding image information and to extract the detailed contents of the information such as by printing or display.

The present invention is not limited to the above-described embodiment. For example, bar codes may be employed as the identification codes. The recording media may also be any of a variety of optical discs, magnetic tapes or the like in place of the above-mentioned magneto-optical discs. The number of sets or pages of the reduced images and the associated identification codes that may be printed on a printing sheet need not be 25. In general there may be n×m sets, where n and m are natural numbers. Only one set of the image and the associated identification code may also be printed on a small-sized paper sheet.

What is claimed is:

1. An information retrieval system for retrieving information from a file comprising;
    image inputting means for inputting image information,
    storage means for storing the image information inputted by said image inputting means and identification codes for retrieving said image information, said identification codes being associated with said image information in a one-to-one relation,
    printing means for printing said input image information along with said identification codes, after an image-reducing operation,
    code reading means for reading said identification codes,
    retrieval means for retrieving the image information associated with the identification code in conformity to said identification codes read out by said code reading means from said storage means;
    wherein said printing means prints a plurality of reduced images and associated identification codes in the vicinity of the associated reduced images on one printing sheet; and
    wherein said file comprises a plurality of sheets; each sheet having at least one of said reduced images and the associated identification codes printed thereon; whereby, a target image information is found by high-speed retrieval by turning over pages of said file, and the identification code in the vicinity of the printed image information thus found is read by said code reading means to read out the image information from said storage means.

2. An information retrieval system according to claim 1, further comprising a display for displaying the image information retrieved by said retrieval means.

3. A system for retrieving information on at least one original image comprising:
    image inputting means for providing an image signal representative of information on said original image to a processing means;
    code generating means for generating a unique, identification code corresponding to said original image and for providing an identification code output signal representative of said identification code to said processing means;
    storage means coupled to said processing means for storing said image signal and said corresponding identification code output signal;
    reducing means connected to said processing means to receive said image signal from at least one of said image inputting means or said storage means;
    said reducing means for providing a reduced image output signal representing a reduced image of said original image having a smaller area than the area of said original image;
    printing means connected to said reducing means for receiving said reduced image output signal and for printing said reduced image;
    said printing means being connected to said processing means for receiving said identification code output signal from at least one of said code generating means or said storage means, and for printing the identification code corresponding to said original image to produce a printed identification code, whereby, the original image may be identified from said printed reduced image;
    code reading means connected to said processing means for reading a printed identification code and for providing an output signal relating to said identification code to said processing means; and
    retrieval means connected to said processing means for retrieving from said storage means said original image information associated with said printed identification code read by said code reading means.

4. An information retrieval system as claimed in claim 3, wherein said at least one original image comprises a plurality of original images and said printing means prints on a printing sheet a plurality of reduced images and associated identification codes; and wherein each identification code is printed in the vicinity of a corresponding reduced image on said printing sheet.

5. An information retrieval system according to claim 4, further comprising a plurality of printing sheets; each printing sheet having said reduced images and the associated identification codes printed thereon; and wherein,
    target image information relating to information desired to be retrieved is found by scanning said reduced images on said plurality of printing sheets until a reduced image having said target image information is reached, after which said identification code in the vicinity of said reduced image having said target image information is read by said code reading means; said code reading means then sends an identification code output signal to said processing means, whereby, corresponding original image information may be retrieved by said retrieval means from said storage means.

6. An information retrieval system according to claim 4, further comprising a display coupled to said processing means for displaying the image information retrieved by said retrieval means.

7. An information retrieval system according to claim 6, further comprising enlargement processing means connected to said display; whereby, said enlargement processing means processes said image information retrieved by said retrieval means to enlarge said displayed image information.

8. An information retrieval system according to claim 3, wherein said at least one original image comprises a single original image and said reduced image and associated identification code are printed by said printing means on a single sheet.

9. An information retrieval system as claimed in claim 3, wherein said at least one original image comprises a plurality of original images and said printing means prints a corresponding plurality of reduced images, each reduced image having a unique identification code for identifying an associated reduced image; each identification code being provided on a printing sheet in the vicinity of its respective associated reduced image; said printing sheet being divided into a plurality of sets, each set comprising one of said reduced images and its associated identification code.

10. An information retrieval system according to claim 3, wherein said at least one original image comprises a plurality of original images and further comprising a plurality of printing sheets; and wherein, for each printing sheet said printing means prints a corresponding plurality of reduced images, each reduced image having a unique identification code for identifying an associated reduced image; each identification code being provided on a printing sheet in the vicinity of its respective associated reduced image; said printing sheet being divided into a plurality of sets, each set comprising one of said reduced images and its associated identification code.

11. An information retrieval system according to claim 3, wherein, a display is connected to said processing means for displaying said information input into the system relating to said at least one original image.

12. An information retrieval system according to claim 3, wherein, said processing means comprises a central processing unit (CPU).

13. An information retrieval system according to claim 3, further comprising data compression and decompression means connected between said storage means and said processing means for compressing said image signal being stored on said storage means and for decompressing said image signal being retrieved from said storage means.

* * * * *